(12) United States Patent
Lingafelt et al.

(10) Patent No.: US 7,483,371 B2
(45) Date of Patent: *Jan. 27, 2009

(54) MANAGEMENT MODULE CONTROLLED INGRESS TRANSMISSION CAPACITY

(75) Inventors: Charles Steven Lingafelt, Durham, NC (US); Norman Clark Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

This patent is subject to a terminal disclaimer.

(21) Appl. No.: 10/465,049

(22) Filed: Jun. 19, 2003

(65) Prior Publication Data

US 2004/0257989 A1 Dec. 23, 2004

(51) Int. Cl.
*H04J 1/16* (2006.01)
(52) U.S. Cl. .................... 370/230; 370/235
(58) Field of Classification Search ............. 370/229, 370/232, 233, 234, 253, 412, 417, 418, 428, 370/429, 235
See application file for complete search history.

(56) References Cited

U.S. PATENT DOCUMENTS

| | | | | |
|---|---|---|---|---|
| 5,825,766 A | * | 10/1998 | Kobayashi et al. | 370/395.64 |
| 6,512,743 B1 | * | 1/2003 | Fang | 370/232 |
| 6,741,570 B1 | * | 5/2004 | Kojima | 370/253 |
| 6,771,602 B1 | * | 8/2004 | Benmohamed et al. | 370/232 |
| 7,068,602 B2 | * | 6/2006 | Davari et al. | 370/232 |
| 7,218,608 B1 | * | 5/2007 | Fang et al. | 370/229 |
| 2002/0036981 A1 | * | 3/2002 | Park | 370/230 |
| 2004/0257990 A1 | * | 12/2004 | Lingafelt et al. | 370/230 |

* cited by examiner

*Primary Examiner*—Chi H Pham
*Assistant Examiner*—Alexander Boakye
(74) *Attorney, Agent, or Firm*—Sawyer Law Group LLP

(57) ABSTRACT

Disclosed is a method of controlling an ingress transmission capacity of an interchassis switch includes comparing the ingress transmission capacity to a threshold capacity; and controlling, using a controller external to the interchassis switch, the ingress transmission capacity responsive to the ingress transmission capacity comparing step.

12 Claims, 2 Drawing Sheets

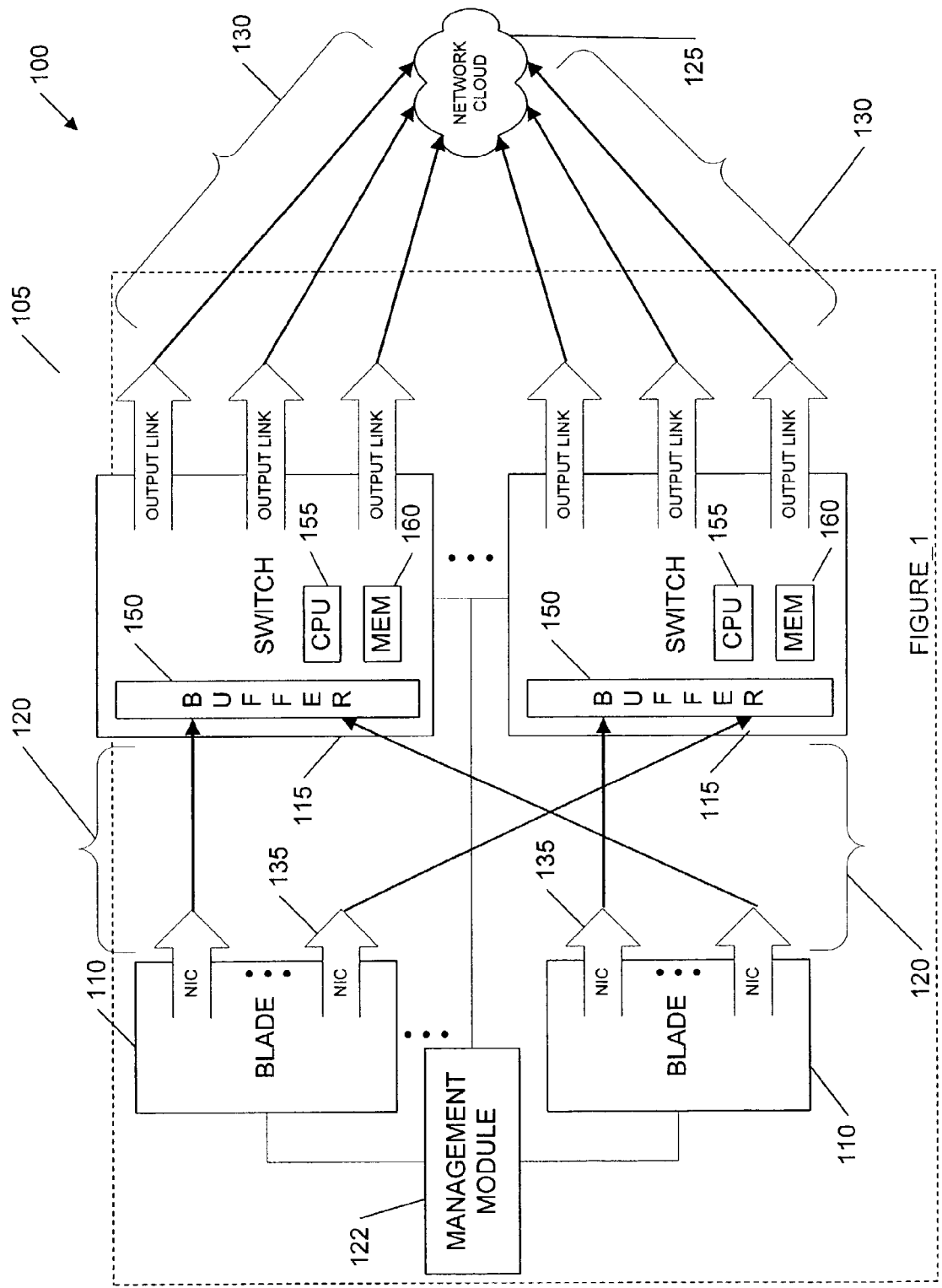
FIGURE_1

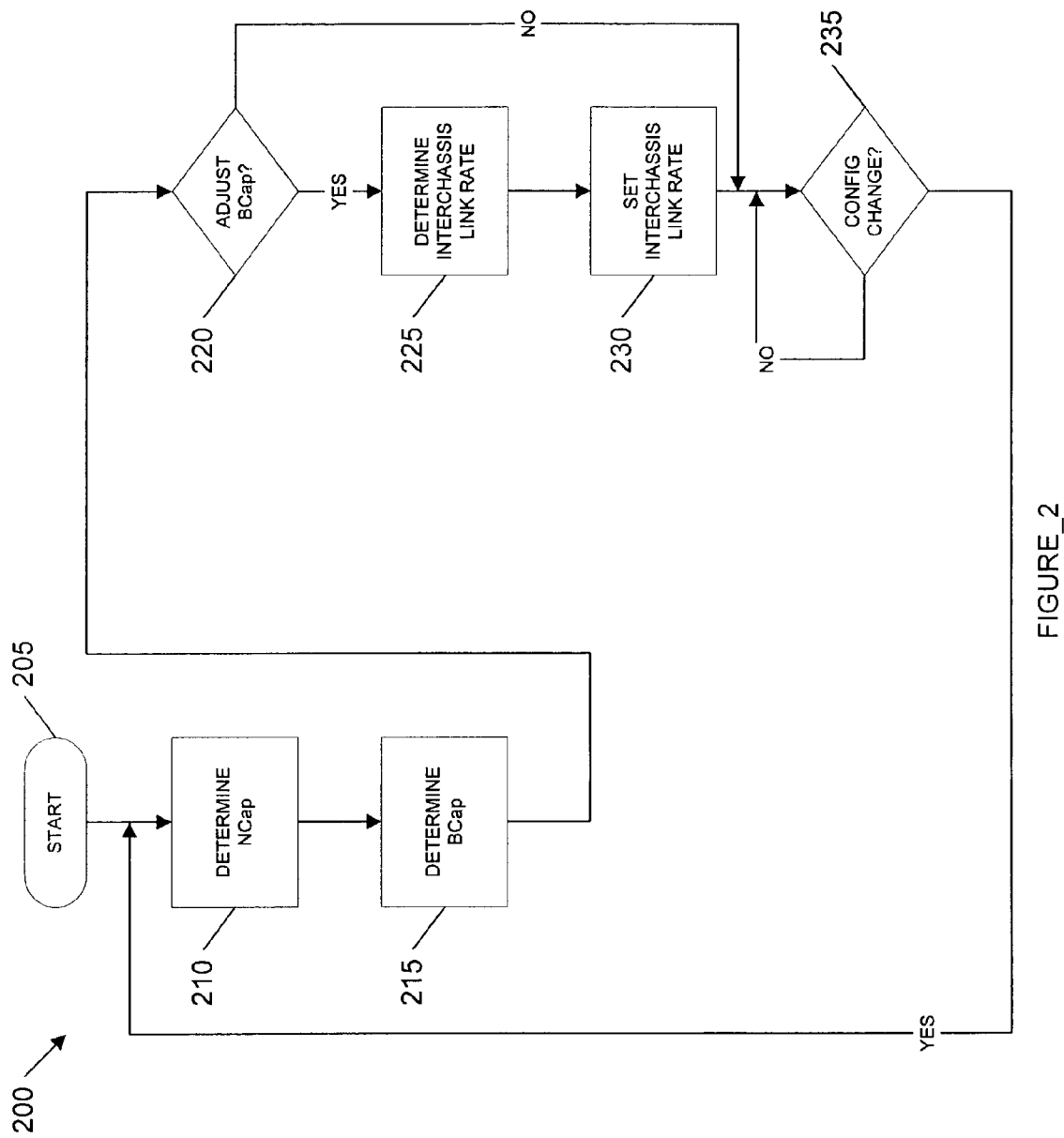
FIGURE_2

MANAGEMENT MODULE CONTROLLED INGRESS TRANSMISSION CAPACITY

CROSS-REFERENCE TO RELATED APPLICATION

The present invention is related to co-pending patent application 10/465,108 entitled "Interchassis Switch Controlled Ingress Transmission Capacity."

FIELD OF THE INVENTION

The present invention relates generally to controlling ingress transmission capacity of a switch, and more specifically to controlling a maximum ingress transmission capacity of an interchassis switch used in a blades and chassis server.

BACKGROUND OF THE INVENTION

A blade and chassis configuration for a computing system includes one or more processing blades within a chassis. Also within the chassis are one or more integrated network switches that couple the blades together into an interchassis network as well as providing access to network connections exiting the chassis. Each blade has one or more network interface connections (NICs) for communicating with NICs incorporated into the switches.

In many implementations, an ingress transmission capacity into any individual switch exceeds the switch egress transmission capacity. The transmission capacity is a function of link speed and link load factor of the aggregated, active NICs. While an interchassis switch often includes an internal buffer that helps to moderate the effects of capacity mismatches, this internal buffer contributes to the final cost and complexity of the blades and chassis server.

Even with an internal buffer, the interchassis switch is always subject to buffer overruns because the NICs are able to transmit packets into receive buffers of the interchassis switch at a higher rate than the interchassis switch can transmit them out of outbound chassis buffers. The size of the buffer only affects how long a capacity mismatch can be sustained, but it does not eliminate buffer overrun conditions.

The buffer overrun condition results in dropped packets at the interchassis switch. The solution for a dropped packet is to cause such packets to be retransmitted by the original blade. Detecting these dropped packets and getting them retransmitted increases network latency and diminishes overall effective capacity. This problem is not unique to the Ethernet protocol and can also exist with other communications protocols.

In some implementations, network transmission capacity of a switch is consolidated into trunks in which two or more channels are combined to provide greater bandwidth. Trunking may be performed across multiple switches or multiple servers. Accordingly, what is needed is a method for decreasing the probability of buffer overruns and improving overall effective capacity of an interchassis network while being easily managed for different network configurations. The present invention addresses such a need.

SUMMARY OF THE INVENTION

Disclosed is a method of controlling an ingress transmission capacity of an interchassis switch includes comparing the ingress transmission capacity to a threshold capacity; and controlling, using a controller external to the interchassis switch, the ingress transmission capacity responsive to the ingress transmission capacity comparing step.

By controlling the maximum ingress transmission capacity, packets are not dropped which thereby significantly decreases network latency and improves network capacity. The controller is able to communicate with each switch and with other controllers in other servers to better manage the server, multiple switches in a server, and multiple servers sharing limited communications bandwidth.

BRIEF DESCRIPTION OF THE DRAWINGS

FIG. 1 is a schematic block diagram of a blade and chassis computing system; and FIG. 2 is a schematic block diagram of an ingress transmission capacity control process.

DETAILED DESCRIPTION

The present invention relates to controlling a maximum ingress transmission capacity of an interchassis switch used in a blades and chassis server. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

FIG. 1 is a schematic block diagram of a preferred implementation for a blade and chassis computing system 100. System 100 includes a chassis 105, one or more blades 110, and one or more interchassis switches 115 coupled to blades 110 by an interchassis network 120, with a management module 122 coupled to each blade 110 and each switch 115. Switches 115 are also coupled to an extrachassis communications system 125 by an extrachassis network 130. Each blade 110 has one or more network interface connections (NICs) 135 that couple it to one or more switches 115. In the preferred embodiment, each chassis 105 includes up to fourteen blades 110 and up to four switches 115, with one NIC 135 per blade 110 per switch 115 (i.e., there is one NIC 135 for every switch 115 on each blade 110) with each switch 115 including a NIC for each blade 110. Each switch 115 defines one interchassis network 120, so there are as many interchassis networks 120 and extrachassis networks 130 as there are switches 115. In other implementations of the present invention, a different number of blades 105, switches 115 and/or NICs 135 may be used depending upon the particular needs or performance requirements. The preferred embodiment advantageously uses a single management module 122 for each server 100.

Each switch 115 includes a buffer 150, a central processing unit (CPU) 155 (or equivalent) and a non-volatile memory 160. Buffer 150 holds incoming packets and outgoing packets, with switch 115 and buffer 150 controlled by CPU 155 as it executes process instructions stored in memory 160. Each interchassis network 120 has, using the switch as the reference frame, a maximum ingress transmission capacity and a maximum egress transmission capacity. The ingress transmission capacity is the aggregate capacity of all active links on network 120 into a particular switch 115 and the egress transmission capacity is the aggregate capacity of all active links on network 130 out of a particular switch 115.

Capacity of a network is a function of the link speed of the network elements and the load factor of those elements. It is known that link connections may have one or more discrete connection speeds (e.g., 10 Mb/sec, 100 Mb/sec and/or 1 Gb/sec), and it is known that the link speed may be auto-negotiated upon first establishing active devices at each end of the link (IEEE 802.3 includes a standard auto-negotiation protocol suitable for the present invention, though other schemes may also be used). The speed parameters of at least one of the devices may be statically defined so as to predetermine the result of a negotiation using that device. Typically, each detected link device is always connected and auto-negotiated at the greatest speed mutually supported. It is anticipated that a NIC 135 will be developed having a variable connection speed over some specified range. The present invention is easily adapted for use with such NICs 135 when they become available.

Management module 122 is configured to control each NIC 135 of each blade 110 and switch 115, with the control implemented through the blade/switch, a software driver for the NIC, and/or firmware of the NIC. In contrast to the related application referenced above, the present invention may be implemented with less costly interchassis switches 115, and one management module 122 may be used for a plurality of interchassis switches 115, and coordinate ingress transmission capacity with knowledge of macroscopic system configurations of the enterprise. Further, in the related application, a maximum ingress transmission capacity was preferably established using discrete, standard link speed values for NICs 135. Management module 122 may be configured to provide more control over the NICs, and may provide for more granularity over NIC 135 functions, including link speed. Also, management module 122 may change link speed without necessarily breaking established links and reestablishing a link at a new desired link speed. Management of server 100 and monitoring of ingress transmission capacity relative to egress transmission capacity of the switches and servers in an enterprise is managed more easily by use of management module 122 that is logically accessible from outside server 100. Further, in some implementations, it may be desirable to provide for a master management module that communicates and controls all management modules 122 of servers 100 in an aggregation of servers in an enterprise.

The present invention controls, per server 100 and per switch 115, the maximum ingress transmission capacity of each interchassis network 120 in response to the current ingress transmission capacity and the egress transmission capacity, on per switch 115 basis, a per server 100 basis, and/or aggregation of servers 100 basis. The preferred embodiment is implemented in each server 100 and dynamically controls maximum ingress transmission capacity by reducing/increasing link speeds and/or reducing/increasing the number of link connections. The link speeds are set either on a per NIC 135 basis, uniformly for all active NICs 135, or selectively, based upon different classifications of NICs 135. The maximum ingress transmission capacity may be changed periodically or it may change automatically in response to changes in the egress transmission capacity or the current ingress transmission capacity as compared to the current effective egress transmission capacity.

In operation, there are several factors that are used to calculate a preferred setting for NIC operation capacity (NICset):

BCap—aggregate capacity of all active blade links to the interchassis switch (N×NICset) (i.e., the ingress transmission capacity)

NCap—aggregate capacity of all active extrachassis network links to the interchassis switch (i.e., the egress transmission capacity)

NICset—capacity of a single NIC (BCap/N)

N—number of NICs attached to the interchassis switch

LoadFactor—the average load or utilization factor, between 0 and 1, of the blade links NCap is, in the preferred embodiment, assumed to be a fixed value determined by a number of external network links and their available peak capacity, while BCap and LoadFactor are taken as adjustable parameters. LoadFactor varies depending upon several well-known factors, including type(s) of application(s) and time of time-of-day. For example, an aggregate NCap of 2 gigabits/second could support up to 10 internal 1 gigabit/second links (BCap=10 gigabits/second) if the LoadFactor is 0.2 or less. However, if 14 internal links were active, the overall BCap would be reduced to achieve the desirable operational range.

The preferred embodiment adjusts BCap by controlling N and/or NICset. Management module 122 may set individual NIC rates to the same value (NICset) so that the aggregate N×NICset is less than or equal to the desired BCap/LoadFactor value. Management module 122 may reduce the maximum number (N) of active blades 105 allowed such that Nmax×NICset is less than or equal to the required BCap/LoadFactor value. Management module 122 may allocate NIC bandwidth using classes of NICs or other prioritization systems. For example, a first set M of NICs may have a first value for NICset1 with remaining NICs having NICset2 so that (M×NICset1)+(Nmax−M)×NICset2) is less than BCap/LoadFactor, based upon apriori knowledge of blade application requirements or similar blade-dependent factors.

Management module 122 sets and enforces NICset based upon each NIC 135 and/or switch 115 and/or server 100 dependent upon the NIC and/or switch and/or server design and capability. For example, most Ethernet NICs support both 100 Mbps and 1 Gbps rates at the physical link level. Using these two discrete link speeds, a NIC can be selectively set to either 100 Mbps or 1 Gbps via the IEEE 802.3 standard auto-negotiation. Currently, this standard does not permit a link speed to be changed after it is initially set, therefore the preferred embodiment will disconnect and auto-negotiate a new appropriate rate for an active link that is to be changed. Management module 122 is able to query each blade 110 and switch 135 to recieve its configuration and operating parameters relevant to the present invention, and in addition, each management module 122 is able to communicate with management modules 122 of other servers 100 to coordinate bandwidth usage across all servers.

However as discussed above, rates other than 10, 100, 1000 Mbps (e.g., 500 Mbps) could be enforced by management module 122 via appropriate driver code or firmware within NICs and/or NIC driver software on the blades and switch, with the 802.3 standard used to auto-negotiate the NIC link speed NICset, or management module 122 directly controlling or setting the desired value for NICset for each NIC or set of NICs. This setting can be accomplished with or without the need to disconnect and reconnect to alter link speed (dynamic configuration).

FIG. 2 is a schematic block diagram of a preferred embodiment for an ingress transmission capacity control process 200 implemented by management module 122. Process 200 is initialized at step 205 and then, at step 210, determines the egress transmission capacity (NCap) of extrachassis network 130.

Next at step 215, process 200 determines the blade NIC capacity (BCap) and process tests, at step 220, whether BCap should be adjusted. In making this determination, process 200 tests whether NCap is less than LoadFactor times BCap.

When NCap is less than LoadFactor times BCap, process 200 advances to step 225 to determine an appropriate interchassis link rate for one or more of NICs 135. Process 200 determines a value for NICset such that BCap is greater than or equal to NCap divided by LoadFactor. Process 200 may establish all NICsets to a single value, all NICsets of particular priority or class to the same value or within predetermined ranges appropriate for the priority or class, or establish NICset differently for each NIC. After step 225, process 200 sets the interchassis link rate NICset at step 230.

Thereafter, process 200 tests, at step 235, whether a chassis change has been made. These changes include changes to NCap, BCap, or the LoadFactor. If no change is detected, process 200 returns to step 235 to continually test for a configuration change. When a change is detected, process 200 returns to step 210 as described above.

When the test at step 220 is negative and NCap is greater than or equal to BCap times LoadFactor, process 200 performs the test at step 235 as described above. In this preferred embodiment, process 200 determines a desired setting for NICset when NCap is too low relative to BCap times LoadFactor. When NCap increases or LoadFactor decreases or BCap falls far enough below NCap, management module 122 may increase BCap while preserving the desired relationship between NCap and BCap.

Depending upon specific implementations and application requirements, process 200 may be adapted and modified without departing from the present invention. For example, process 200 may disable one or more selected NICs and inhibit reconnection as discussed above. In some implementations, certain blades may have a higher priority than other blades. In these cases, process 200 can selectively restrict NICset or disconnect NICs of lesser priority blades. Also, the BCap may be tuned using dynamic information relating to the LoadFactor of the ingress transmission capacity.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of controlling a maximum ingress transmission capacity of an interchassis switch in a network having one or more network interface connections (NICs), comprising the steps of:
    a) comparing the ingress transmission capacity to a threshold transmission capacity; and
    b) controlling, using a controller external to the interchassis switch, the maximum ingress transmission capacity responsive to the ingress transmission capacity comparing step a) to not exceed the egress transmission capacity,
    wherein transmission capacity is a function of link speed and load factor, and
    wherein the ingress transmission capacity is an aggregate capacity of all active links on the network into the switch and the egress transmission capacity is the aggregate capacity of all active links on the network out of the switch.

2. The method of claim 1 wherein each of the network interface connections is an active link operable at a plurality of link speeds and wherein the controlling step b) controls ingress transmission capacity by selecting an up-to-maximum link speed for one or more of the network interface connections.

3. The method of claim 1 wherein the interchassis switch includes an egress transmission capacity that changes periodically and wherein the controlling step b) dynamically controls the ingress transmission capacity responsive to current egress transmission capacity and current ingress transmission capacity.

4. The method of claim 1 wherein the interchassis switch includes an egress transmission capacity, wherein the ingress transmission capacity changes periodically and wherein the controlling step b) dynamically controls the ingress transmission capacity responsive to current egress transmission capacity and current ingress transmission capacity.

5. The method of claim 1 wherein the interchassis switch includes a buffer and an egress transmission capacity and wherein the controlling step b) dynamically controls the ingress transmission capacity responsive to current egress transmission capacity, current ingress transmission capacity and current buffer capacity.

6. The method of claim 1 wherein a particular link speed of a connection between a network interface component and the interchassis switch results from an auto-negotiation.

7. The method of claim 5 wherein the controlling step b) terminates a link and controls a subsequent auto-negotiation of the link to select a suitable one of the plurality of link speeds when it controls ingress transmission capacity.

8. The method of claim 1 wherein a particular link speed of a connection between a network interface component and the interchassis switch results from a dynamic configuration.

9. The method of claim 1 wherein the controlling step b) uses a port speed priority for each of the plurality of network interface connections when controlling the ingress transmission capacity.

10. The method of claim 1 wherein the controlling step b) controls the ingress transmission capacity using multiple link speeds for the plurality of network interface connections.

11. The method of claim 1 wherein the controlling step b) controls the ingress transmission capacity using a matching link speed for the plurality of network interface connections.

12. The method of claim 1 wherein the controlling step b) controls the ingress transmission capacity by inhibiting establishment of new links between one or more network interface connections and the interchassis switch.

* * * * *